Patented Nov. 1, 1949

2,486,657

UNITED STATES PATENT OFFICE 2,486,657

DIOLEFIN PHOSPHONIC ACIDS AND POLYMERS THEREOF

Gennady M. Kosolapoff, Dayton, Ohio, assignor to Monsanto Chemical Company, St. Louis, Mo., a corporation of Delaware No Drawing. Application April 28, 1945,
Serial No. 590,971

16 Claims. (Cl. 260—80)

The present invention is a continuation-in-part of my copending application Serial No. 498,865, filed August 16, 1943, now Patent No. 2,389,576.

This invention relates to new phosphorus-containing compounds, particularly to new aliphatic diolefinic monophosphonic acids, their esters and polymers thereof and to methods of producing the same. Specifically it is concerned with the preparation of butadiene or isoprene phosphonic acids by a reaction of phosphorus pentachloride with butadiene or isoprene, subsequent treatment of the resulting addition products with a hydroxy compound and dehydrohalogenation of the compounds thus obtained.

An object of the present invention is the preparation of new phosphorus-containing polymerizable compounds. Another object of the invention is the preparation of new stable phosphorus-containing polymers. Still another object of the invention is the provision of vulcanizable fire-resistant, rubbery materials. Other objects will be hereinafter disclosed.

In the copending application Serial No. 498,865, referred to above, there is disclosed and claimed the preparation of diolefin phosphonic acids by reaction of a dichloralkene with a trialkyl phosphite or an alkali metal dialkyl phosphite. The products thus obtained are therein characterized as the 1-phosphonic acids, the product from butadiene, for example, being butadiene 1-phosphonic acid. When preparation of diolefin phosphonic acids is effected by primary reaction of butadiene or isoprene with phosphorus pentachloride, however, the product consists not of a single isomer, but of a mixture of isomeric phosphonic acids which are not readily separated. I have found that for the preparation of valuable polymeric materials separation of isomeric diolefinic phosphonic acids so obtained is not necessary, the mixture of isomers itself being advantageously used in the manufacture of highly valuable phosphorus-containing synthetic, resinous materials. Hence, while I have been unable to particularly characterize the individual isomers present in the reaction products obtained by the present process, I have found that the product obtained by the present process does constitute a mixture of isomeric diolefinic phosphonic acids which is useful for the manufacture of polymeric materials. Accordingly, throughout the description which follows, the products of the present invention will be referred to simply as mixtures of isomeric butadiene phosphonic acids, isoprene phosphonic acids or the esters thereof. Moreover, since polymerizable compounds are desired, the presence of substituent groups such as phenyl groups in the butadiene or isoprene should be avoided.

In preparing my new mixtures of isomeric diolefin phosphonic acids or esters thereof, I prefer to proceed substantially as follows. I add butadiene or isoprene to phosphorus pentachloride preferably with cooling in the presence of an inert solvent, allow the resulting reaction mixture to stand for a period varying from a few hours to several days, and then treat the resulting product either with water or another material containing a hydroxy group, for example, a lower aliphatic alcohol. Depending upon whether water or an alcohol is employed, the product so obtained is a mixture of either isomeric, chloralkene phosphonic acids or a mixture of isomeric chloroalkene phosphonates. In order to convert the chloralkene compounds into dienes the former are treated with a dehydrohalogenating agent, for example, potassium hydroxide, caustic soda, etc. For the preparation of a mixture of the diesters of 1,3-butadiene-1-phosphonic acid and 1,3-butadiene-2-phosphonic acid, the reactions are believed to proceed as follows:

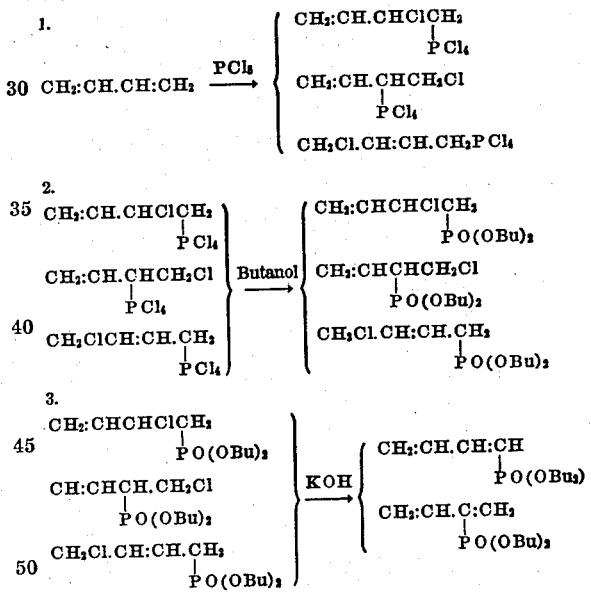

In the above series of reactions, reaction 1 illustrates the addition of PCl₅ to the diolefin to produce three isomeric chloralkene phosphorus tetrachlorides. Reaction 2, is which butanol is employed merely as an example of a suitable esterifying alcohol, yields the corresponding chloralkene diesters. Other aliphatic alcohols, preferably having from 1 to 5 carbon atoms, may be similarly employed. Isoprene may be treated by the same reagents. For certain purposes a mixture of butadiene and isoprene may be employed.

Reaction 3 illustrated the dehydrohalogenation of the chloralkene diester to the dibutyl butadiene phosphonate. The reaction is illustrated with KOH; however, other alkalies such as NaOH or alkaline carbonates such as alkali metal and alkaline earth carbonates may be employed. Reactions 2 and 3 may be carried out simultaneously by employing an alkaline solution of the appropriate alcohol, as the esterifying and dehydrochlorinating reagent. Since it has been found that for the production of valuable rubbery materials the mixture of diolefinic-1-phosphonates and the diolefinic-2-phosphonates serves as well as do the individual isomers, alone, there is no necessity for isolating the individual constituents of the isomeric mixture. Valuable rubber-like polymers are obtained by the polymerization of such mixtures, or the individual components and the mixtures or components may also be advantageously employed for the preparation of other materials for use in the arts, for example, fire-proofing agents, surface-active agents, etc.

If it is desired to prepare a mixture of free phosphonic acids instead of the phosphonates, the mixture of chloroleﬁn phosphorus tetrachlorides obtained in the first equation given above is treated with water instead of with an alcohol and the product so obtained consists of a mixture of chloroleﬁn phosphonic acids rather than the butyl esters obtained in the second equation. Dehydrohalogenation of the chloroleﬁn phosphonic acids thus obtained proceeds substantially as shown above, the free dioleﬁnic phosphonic acids being obtained by treatment of the chloroleﬁn phosphonic acids with potassium hydroxide or another dehydrohalogenating agent. While the dioleﬁn phosphonates are readily obtainable in the monomeric state by distillation of reaction mixtures containing the same, the oleﬁn phosphonic acids are usually spontaneously converted to polymeric products during their isolation. The free monomeric phosphonic acids are highly water soluble and separation of the same from water is a matter of some difficulty. However, the polymeric phosphonic acids may be isolated as shown below.

Polymerization of the dioleﬁnic phosphonates is readily effected in mass at increased temperatures, say, at temperatures of from 50° C. to 120° C. in presence or absence of catalysts of polymerization. As catalysts there may be employed organic or inorganic oxygen-cleaving substances such as benzoyl peroxide, acetyl peroxide, ammonium persulfate, hydrogen peroxide, etc. Polymerization may also be effected by irradiation of the monomer, for example, by exposure of the monomer to the rays of a General Electric sunlamp or to any source of ultra-violet light. Depending upon the poylmerization conditions employed, the polymeric products range from viscous liquids to porous, elastic solids.

Polymerization of the present monomeric dioleﬁnic phosphonates may be likewise effected by polymerization in a liquid media, which is a solvent for the monomeric phosphonate and a non-solvent for the polymer.

The present polymers are soluble in the commonly employed organic solvents. The unsaturation of the polymers permits vulcanization of the same, and the hard, rubbery materials which are obtained upon vulcanization are distinguished by insolubility in the common organic solvents, for example, benzene, carbon tetrachloride, gasoline, acetone, etc., and by a high degree of heat-stability and fire-resistance. When held in an open flame, the vulcanized polymeric dioleﬁnic phosphonates do not ignite, the only visible change which they undergo being a slight swelling and distortion.

The monomeric dioleﬁnic phosphonates may also be advantageously employed as intermediates in the preparation of a large number of materials of industrial interest, for example, fire-proofing agents, surface-active agents, insecticides, etc. Thus, chlorination of the dioleﬁnic phosphonates yields tetrachlorobutanephosphonates or tetrachloro-2-methylbutanephosphonates, which may be advantageously employed for impregnating textiles or other fibrous products for the purpose of flame-proofing the same.

The invention is further illustrated, but not limited, by the following examples:

EXAMPLE 1

*Preparation and polymerization of a mixture of diethyl 1,3-butadiene-1-phosphonate and diethyl 1,3 - butadiene - 2 - phosphonate.*—Into a cooled and stirred suspension of 208 grams, (1 mol) of phosphorus pentachloride in 800 cc. of benzene, 100 cc. of liquid butadiene (1.16 mols) was distilled over a period of 2 hours. Stirring with ice-cooling was continued for 3 hours, and the reaction vessel was then packed in ice and allowed to stand for 2 days. At the end of this time, with continued cooling and stirring, 200 grams of dry ethanol was added to the creamy mass and the resulting mixture was heated for 20 minutes to gentle reflux and cooled. Upon filtering off the small amount of insoluble matter which was present, the product was concentrated in vacuo to 296 grams of a yellow liquid. Chlorine analysis of this solution showed the presence of approximately 1 mol of labile chlorine in the total product (0.9779 gram gave 0.478 gram AgCl), and indicated the formation of a chloralkene phosphonic acid. This was treated with ice-cooling and stirring with a solution of 56 grams of potassium hydroxide in 500 cc. of dry ethanol, the mixture was stirred for 1 hour, centrifuged and the clear solution thus obtained distilled in vacuo. The greater part of the material boiled at a temperature of 100° C. to 124° C. at a pressure of 11 mm. of mercury, the following fractions boiling within this range being collected.

| Fraction | $n_D^{25}$ | B. P. °C./11 mm. | Per Cent P |
|---|---|---|---|
| 1 | 1.4187 | 100.0–105 | 15.70 |
| 2 | 1.4233 | 105.5–110 | 15.90 |
| 3 | 1.4320 | 111.0–115 | 15.43 |
| 4 | 1.4400 | 117.5–124 | 16.32 |

All of the above fractions were initially colorless liquids which turned somewhat yellow upon standing. The high degree of unsaturation of these materials is evidenced by the fact that they reduce permanganate solutions instantly in the cold. The phosphorus content of these fractions corresponds, within the limits of experimental error, to the theoretrical phosphorus content of diethyl butadienephosphonate, i. e., 16.31%. Accordingly, the above fractions represent mixtures of the diethyl esters of 1,3-butadiene-1-phosphonic acid and 1,3-butadiene-2-phosphonic acid.

The above fractions were essentially chlorine-free. The residue in the flask from which the above four fractions were obtained was then subjected to further distillation and a product distilling from 127° C. to 158° C. at 11 mm. was recovered in two separate fractions. These fractions had the properties and composition shown below:

| Fraction | $n_D^{25}$ | B. P. °C./11 mm. | Per Cent P | Per Cent Cl |
|---|---|---|---|---|
| 5 | 1.4552 | 127–140 | 15.5 | 5.09 |
| 6 | 1.4620 | 143–158 | 13.8 | 11.81 |

Theory for chlorobutadiene diethylphosphonate:
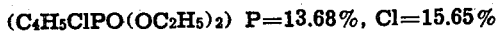
$(C_4H_5ClPO(OC_2H_5)_2)$ P=13.68%, Cl=15.65%

Fraction 5 probably consists of a mixture of the compounds in fractions 4 and 6. Fraction 6 is mostly a chlorobutadiene diethyl phosphonate, which may be further purified by subjecting it to a further fractionation.

Polymerization of each of fractions 1 to 4 above was conducted as follows: 5 gram samples of each fraction were treated with 2% by weight of benzoyl peroxide and heated in stoppered test tubes at 85° C. for a period of 3 weeks. At the end of this time fractions 1 and 2 were viscous liquids and the fractions 3 and 4 were semi-solids. When each of the polymerized fractions was dissolved separately in benzene and then precipitated with hexane, somewhat viscous gums were obtained in all cases. When these gums were heated with sulfur at a temperature of from 130° C. to 150° C. they were converted to hard, grey masses which were similar to hard rubber. These products were non-combustible and insoluble in benzene, acetone, carbon tetrachloride, and gasoline.

EXAMPLE 2

*Preparation and polymerization of a mixture of dibutyl isoprene-3-phosphonate and dibutyl isoprene-4-phosphonate.*—50 cc. of isoprene was slowly added to a cooled, stirred suspension of 104 grams of phosphorus pentachloride in 400 cc. of benzene during a period of approximately 2½ hours. The resulting mixture was allowed to stand overnight and then 250 cc. of dry butanol was added to it dropwise. The clear, yellow solution which formed was heated briefly to reflux, cooled, poured on ice, and the organic layer separated. The latter was added slowly to a warm, 10% aqueous solution of sodium hydroxide, shaken thoroughly and the organic layer was taken up, washed with water and distilled in vacuo. There was thus obtained a fraction, B. P. 165° C. to 180° C. at 18 mm. which upon redistillation gave 35 grams of the substantially pure, oily mixture of dibutyl isoprene-3-phosphonate and dibutyl isoprene-4-phosphonate, B. P. 170° C. to 172° C. at a pressure of 15 mm. of mercury. The molecular weight of the product was found to be 268 as against 260, the calculated molecular weight of dibutyl isoprenephosphonate and the refractive index of the mixture of phosphonates obtained was $n_D^{25}$ 1.4510.

The mixture of dibutyl isoprenephosphonates obtained as described above is somewhat more stable and is not as readily polymerized as is the mixture of diethyl butadienephosphonates of Example 1. The present mixture of dibutyl phosphonates may be employed for the production of highly chlorinated alkane phosphonates by introduction of chlorine by addition at the two olefinic double bonds and the chlorinated products advantageously used for the flame-proofing of textiles and other fibrous products.

EXAMPLE 3

This example illustrates the preparation of polymeric isoprene phosphonic acids. 104 grams of phosphorus pentachloride was suspended with stirring in 400 cc. of benzene and there was then added 40 grams of isoprene over a period of 50 minutes, stirring being continued during addition of the diolefin. The reaction mixture was agitated for an additional 1.5 hours and then allowed to stand overnight. At the end of that time the resulting creamy mixture may be poured on ice or into cold water. The aqueous layer was separated and the benzene layer was added slowly to an excess of 10% aqueous sodium hydroxide. After the vigorous reaction had subsided the resulting alkaline layer was separated, combined with the water extract (400 cc. of the organic layer) and the whole evaporated to drive off the benzene. The residue, after extracting with alcohol, concentrating the extract, and acidifying by means of HCl, gave 5 grams of a dark oil which was shown upon analysis to be a polymeric isoprene phosphonic acid. The dark oil was changed to a solid when cooled to temperatures below 10° C. Vulcanization of this material by heating the same with sulfur gave a hard, rubbery product which possessed some thermoplasticity on heating and could be ground to a molding powder when cold. Molded products obtained from the powder were smooth, non-flammable and of good mechanical strength and solvent resistance.

EXAMPLE 4

This example describes a preparation of butadiene phosphonic acid. 25 cc. of butadiene was slowly distilled into a cooled and stirred suspension of 104 g. of phosphorus pentachloride in 400 cc. of benzene. There was obtained a thick, white, creamy product which settled partially when allowed to stand overnight. This partially settled product was poured on ice and the resulting organic layer was separated and treated with a slight excess of 10% aqueous sodium hydroxide. The alkaline layer was concentrated to crystallization, treated with alcohol, acidified with HCl and the salts filtered off; the alcoholic filtrate contained a mixture of butadiene phosphonic acids in solution as shown by analysis of organic phosphorus present therein. Evaporation of the solution yielded the partially polymerized butadiene phosphonic acids as a dark oily liquid. Heating of this material on a water bath for 2 days converted it to a more viscous product which was non-combustible. When heated with sulfur the viscous material was converted into a hard, rubber-like material.

Mixtures of polymeric diolefin phosphonic acids may also be obtained by hydrolysis of polymeric phosphonates. For instance, the polymeric butyl isoprene phosphonate of Example 2, which material is insoluble in water, may be treated with an acid or an alkali hydrolyzing agent, for example, hydrochloric acid, sodium hydroxide, etc. to yield polymeric butadiene phosphonic acid, which material is a water soluble product. The polymeric butadiene or isoprene phosphonic acids are advantageously employed as textile treating agents, for example, as sizing agents in the preparation of textile printing pastes, etc. Fibrous materials treated with the butadiene phosphonic acids are rendered substantially non-combustible. The present phosphonic acids may thus be employed as flame-proofing agents. Both the polymeric diolefin phosphonic acids and their lower alkyl esters are valuable as thickening agents in the preparation of creams and emollients. The polymeric dialkyl butadiene or isoprene phosphonates being insoluble in water may be used as impregnating agents for a wide variety of purposes. While application of the present diolefin phosphonic acids and phosphonates as thickening agents and textile treating materials is of interest, the new products are most advantageously employed for the preparation of hard, rubbery materials by vulcanization of the same, for example, by treatment with sulfur. Valuable products are also obtained by submitting the viscous or soft, rubbery, polymeric materials to halogenation, whereby there are obtained highly chlorinated materials of pronounced solvent-resistance and non-flammability.

A great deal of latitude may be exercised in preparing the mixture of monomeric diolefin phosphonic acids or esters thereof. Addition of phosphorus pentachloride to the butadiene for the preparation of the chloro-olefin phosphorus tetrachloride may be carried out either in the presence or absence of a diluent. As diluents there may be employed any inert liquid material, for example, benzene, toluene, hexane, petroleum ether, carbon tetrachloride, etc. When the reaction is carried out in the absence of a diluent, addition is preferably made at low temperatures and vigorous stirring is employed. When operating at room temperatures an inert solvent is advantageously employed in order to dissipate reaction heat. The temperature is desirably maintained below 20° C. by means of cooling devices. Conversion of the chloro-olefin phosphorus tetrachloride to the phosphonic acid or phosphonate may be effected by treating the chloride with any hydroxy compound at ordinary or increased temperatures. As the hydroxy compound, there may be employed water, any of the lower aliphatic alcohols, such as methanol, ethanol, isopropanol, isobutanol, n-butanol, amyl alcohol, etc. Aryl esters of the diolefinic phosphonic acids are obtained when the hydroxy compound is a phenol. The conversion of the tetrachloride to phosphonate may also be effected by treatment with an aralkyl alcohol such as benzyl alcohol, etc. Mixed esters of the diolefinic phosphonic acids may be obtained by treating the chloro-olefin phosphorus tetrachlorides with mixtures of hydroxy-containing compounds. Dehydrohalogenation of the chloro-olefin phosphonic acids or phosphonates is readily effected. The chloro-olefinic materials are comparatively unstable and hydrogen chloride may be evolved therefrom simply by heating or refluxing at ordinary atmospheric pressure or preferably by treating them with a basically reacting material either at ordinary or increased temperatures. As basically reacting materials for dehydrohalogenation of the chloro-olefinic phosphonic acids or phosphonates, there may be employed inorganic alkaline material such as potassium hydroxide, sodium hydroxide, ammonium hydroxide, sodium carbonate or organic bases such as pyridine, triethylamine, etc.

The above description and examples are intended to be illustrative only and not to limit the scope of the invention. This invention extends to all modifications and variations which fall within the spirit and scope of the appended claims.

What I claim is:

1. The process for producing butadiene and isoprene phosphonic acids which comprises mixing a hydrocarbon of the class consisting of butadiene and isoprene with phosphorus pentachloride while maintaining the temperature of the mixture below 20° C. to form the corresponding chloroalkene phosphorus tetrachlorides and then mixing said chloroalkene phosphorus tetrachlorides with an alkaline material in aqueous solution to dehydrochlorinate and hydrolyze said chloroalkene phosphorus tetrachlorides and to yield isomeric mixtures of butadiene and isoprene phosphonic acids.

2. The process defined in claim 1 in which the alkaline material employed is sodium hydroxide.

3. In the process for producing butadiene and isoprene phosphonic acids, the steps of adding a compound selected from the class consisting of butadiene and isoprene to phosphorus pentachloride which is maintained at a temperature below 20° C., in such proportions as to form chloralkene phosphorus tetrachlorides, and then hydrolyzing and dehydrochlorinating said chloralkene phosphorus tetrachlorides by treatment with an aqueous solution of an alkaline material.

4. In the process for producing butadiene and isoprene phosphonic acids, the steps of adding a compound selected from the class consisting of butadiene and isoprene to phosphorus pentachloride which is dissolved in an inert organic solvent and maintained at a temperature below 20° C., in such proportions as to form chloralkene phosphorus tetrachlorides and then hydrolyzing and dehydrochlorinating said chloralkene phosphorus tetrachlorides by treatment with an aqueous solution of sodium hydroxide.

5. The process which comprises mixing phosphorus pentachloride with a hydrocarbon of the class consisting of butadiene and isoprene while maintaining the temperature of said mixture below 20° C. to form the corresponding chloroalkene phosphorus tetrachloride and then mixing said chloroalkene phosphorus tetrachloride with a compound selected from the class consisting of water and aliphatic alcohols in the presence of an alkaline material.

6. The process which comprises mixing phosphorus pentachloride with a compound selected from the class consisting of butadiene and isoprene while maintaining the temperature below 20° C. and forming an isomeric mixture of chloralkene phosphorus tetrachlorides and then mixing the said chloralkene phosphorus tetrachlorides with a compound selected from the class consisting of water and aliphatic alcohols containing from 1 to 5 carbon atoms.

7. The process which comprises mixing phosphorus pentachloride with a compound selected from the class consisting of butadiene and isoprene while maintaining the temperature below 20° C. to form an isomeric mixture of chloralkene phosphorus tetrachlorides and then mixing the said chloralkene phosphorus tetrachlorides with water.

8. The process which comprises mixing phosphorus pentachlorides with a compound selected from the class consisting of butadiene and isoprene while maintaining the temperature of the mixture below 20° C. to form an isomeric mixture of chloralkene phosphorus tetrachlorides and then mixing the said chloralkene phosphorus tetrachlorides with an aliphatic alcohol having from 1 to 5 carbon atoms.

9. The process which comprises mixing phosphorus pentachloride with a compound selected from the class consisting of butadiene and isoprene while maintaining the mixture below 20° C. to form an isomeric mixture of chloralkene phosphorus tetrachlorides and then mixing the said chloralkene phosphorus tetrachlorides with ethanol.

10. The process which comprises mixing phosphorus pentachloride with a compound selected from the class consisting of butadiene and isoprene while maintaining the temperature thereof below 20° C. and forming an isomeric mixture of chloralkene phosphorus tetrachloride.

11. The process which comprises mixing in the presence of an inert solvent phosphorus pentachloride with a compound selected from the class consisting of butadiene and isoprene while maintaining the temperature thereof below 20° C. and forming an isomeric mixture of chloralkene phosphorus tetrachlorides.

12. A composition selected from the class consisting of butadiene and isoprene mixed isomeric phosphonic acids.

13. A polymerizable composition consisting of mixed isomeric isoprene phosphonic acids.

14. Polymeric isomeric isoprene phosphonic acids.

15. Polymeric isomeric butadiene phosphonic acids.

16. A composition consisting of a mixture of isomers of butadiene phosphonic acid.

GENNADY M. KOSOLAPOFF.

REFERENCES CITED

The following references are of record in the file of this patent:

UNITED STATES PATENTS

| Number | Name | Date |
|---|---|---|
| 2,137,792 | Woodstock | Nov. 22, 1938 |
| 2,254,124 | Stevens | Aug. 26, 1941 |
| 2,279,501 | Dickey et al. | Apr. 14, 1942 |
| 2,279,502 | Dickey et al. | Apr. 14, 1942 |
| 2,286,792 | Dickey et al. | June 16, 1942 |
| 2,286,794 | Dickey et al. | June 16, 1942 |
| 2,365,466 | Hamilton | Dec. 19, 1944 |

OTHER REFERENCES

Bergmann, "Berichte der Deutschen chemischen Gesellschaft," vol. 64B, pages 1455–1480 (1931); vol. 63V, pages 1158–1173 (1930); vol. 66, pages 286–291 (1933).

Parfentev, "Chemical Abstracts," vol. 35, page 3963 (1941).